United States Patent [19]
Gettinger et al.

[11] Patent Number: 5,638,858
[45] Date of Patent: Jun. 17, 1997

[54] GAS CYLINDER SAFETY COVER

[76] Inventors: Wayne A. Gettinger; Eleanor R. Gettinger, both of 545 Lynn Haven, Hazelwood, Mo. 63042

[21] Appl. No.: 202,771

[22] Filed: Feb. 28, 1994

[51] Int. Cl.$^6$ .................................................. F16K 27/12
[52] U.S. Cl. .......................................... 137/382; 220/728
[58] Field of Search ............................ 137/382, 377, 137/381; 220/726, 728, 582; 222/182

[56] References Cited

U.S. PATENT DOCUMENTS

| | | | |
|---|---|---|---|
| 2,080,728 | 5/1937 | MacNeill et al. | 220/728 |
| 3,958,716 | 5/1976 | Korte | 137/382 X |
| 4,352,370 | 10/1982 | Childress | 137/382 |
| 4,600,033 | 7/1986 | Baron | 137/382 |
| 4,678,003 | 7/1987 | Griffin | 220/728 X |
| 4,944,424 | 7/1990 | Wood, Jr. | 137/382 X |
| 5,058,758 | 10/1991 | Suddeth | 137/382 X |

FOREIGN PATENT DOCUMENTS

| | | | |
|---|---|---|---|
| 403775 | 1/1934 | United Kingdom | 220/728 |

Primary Examiner—Gerald A. Michalsky
Assistant Examiner—Kevin L. Lee

[57] ABSTRACT

A new and improved gas cylinder safety cover for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage. The gas cylinder safety cover comprises a rigid shield releasably attachable to a standard compressed gas cylinder. The shield has perforated metal sides wherethrough the gas cylinder gauges may be viewed, and a fixed metal top. The shield further has a metal bottom plate hingedly connected thereto whereby the valve, gauge, and regulator assembly is exposed when the shield is hinged back open or enclosed when the shield is hinged forward closed. The new gas cylinder safety cover further includes a latch to secure the shield in the closed position and a bracket to releasably secure the shield to the gas cylinder body.

11 Claims, 4 Drawing Sheets

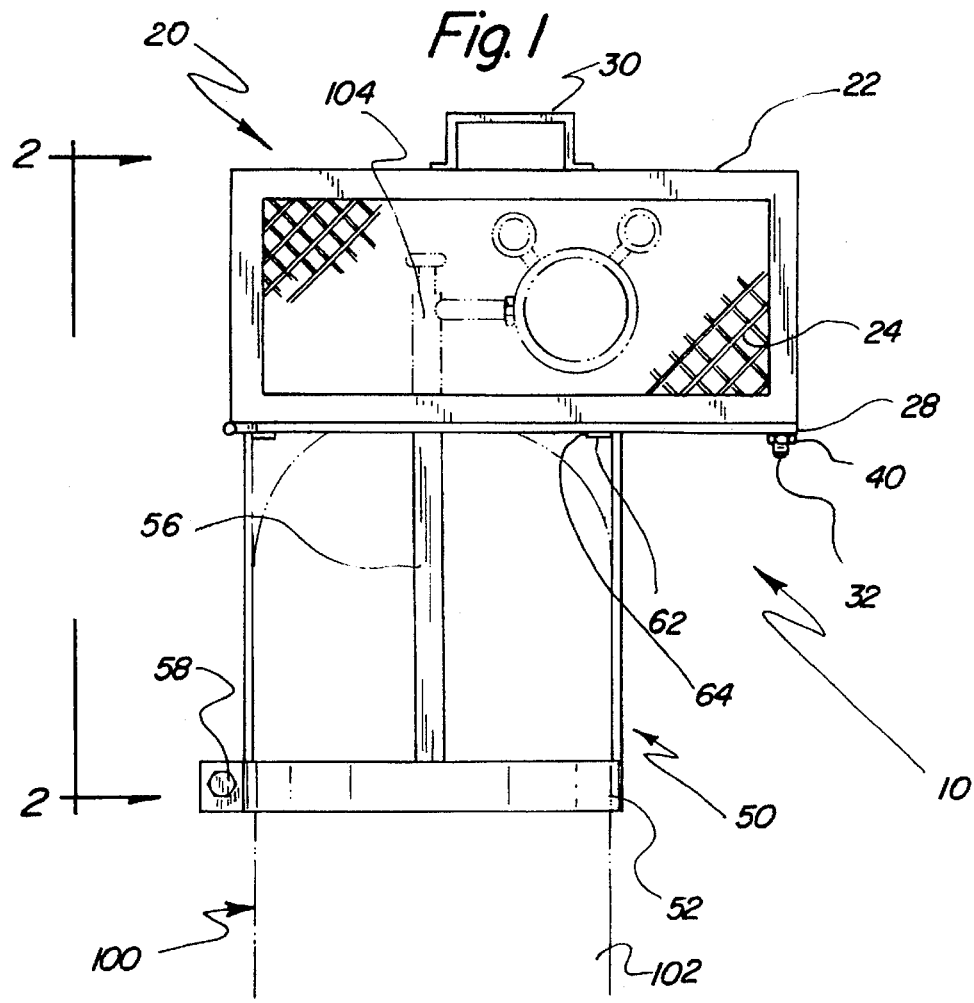
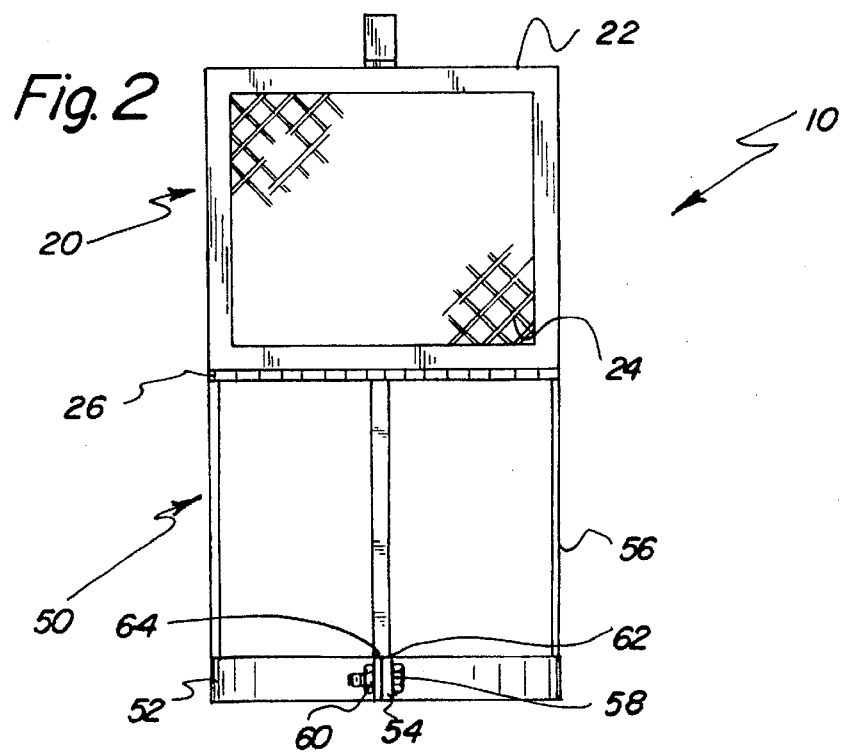

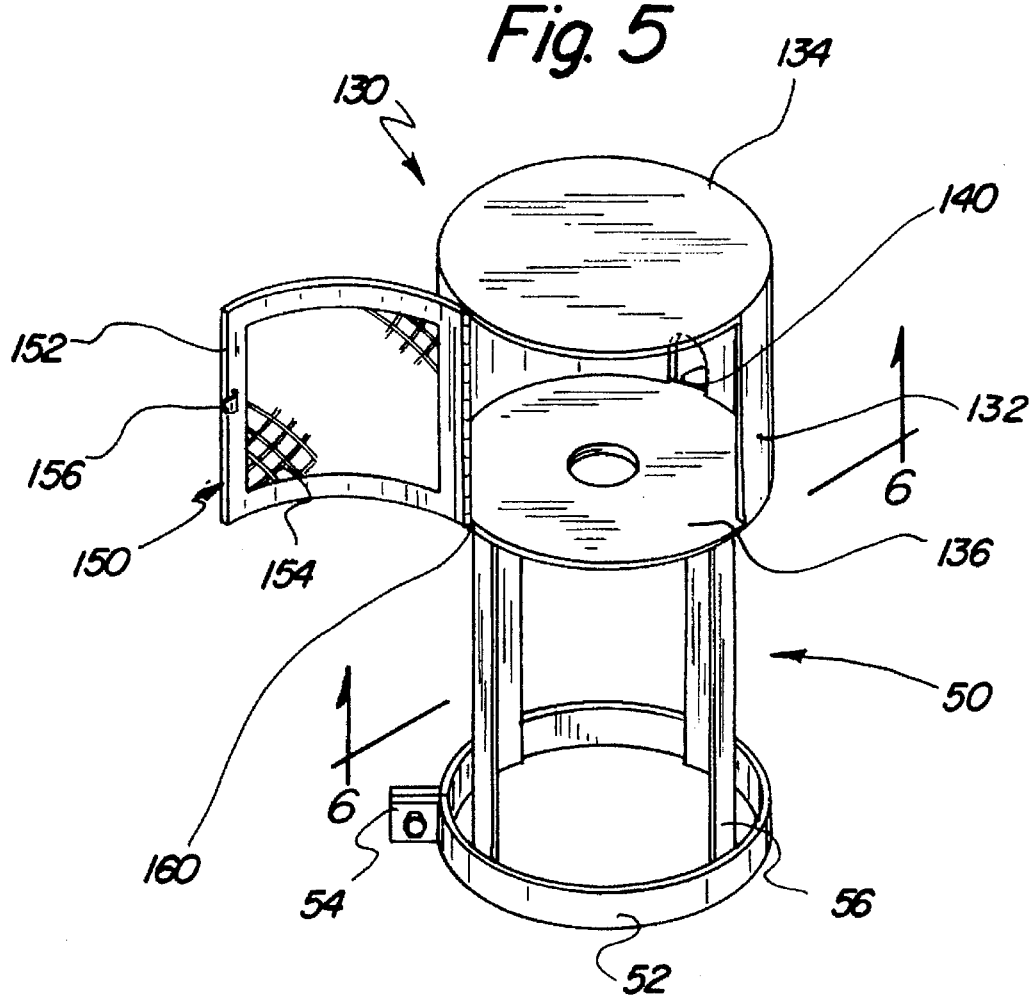
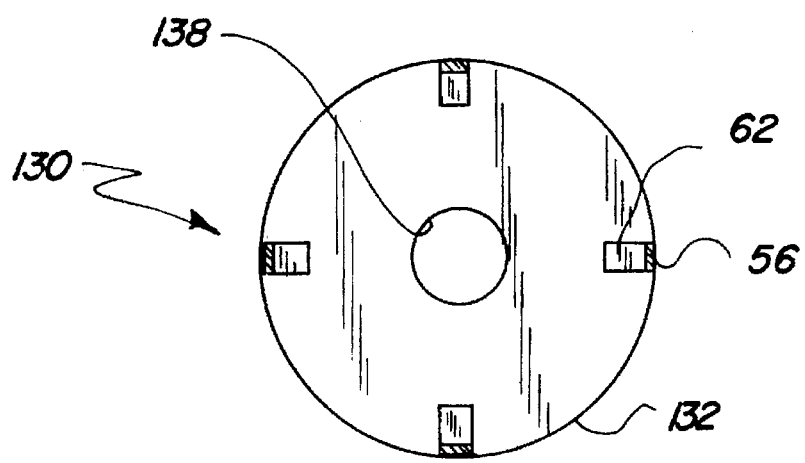

GAS CYLINDER SAFETY COVER

BACKGROUND OF THE INVENTION

1. Field of the Invention

The present invention relates to valve protectors and more particularly pertains to gas cylinder safety covers which may be adapted for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage.

2. Description of the Prior Art

The use of valve protectors is known in the prior art. More specifically, valve protectors heretofore devised and utilized for the purpose of protecting valved discharge openings of pressurized fluid cylinders during handling and transporting of the cylinders are known to consist basically of familiar, expected and obvious structural configurations, notwithstanding the myriad of designs encompassed by the crowded prior art which have been developed for the fulfillment of countless objectives and requirements.

The present invention is directed to improving devices for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage in a manner which is safe, secure, economical and aesthetically pleasing.

For example, U.S. Pat. No. 5,058,758 to Suddeth discloses a removable protective cover for attachment to the valve and gauge assembly commonly used with portable compressed gas cylinders. The protector is easily attached to an existing valve, regulator and gauge assembly in basically two mating elements constructed for strength to absorb unexpected impact to the valve assembly. The protective cover is removably attached to the gas cylinder and is placed adjustably into counter opposing contact with the valve assembly so that the force of any impact to the valve assembly area is transmitted through the protective cover, rather than into potentially damaging contact with the valve assembly. The mating halves of the protective cover are clamped around the threaded neck of the cylinder for basic support, constructed to totally enclose the valve assembly, and include contact between the cover and the valve assembly which may be adjusted by means of locking screws, while still exposing the reporting gauges through openings in the protective cover. The device disclosed will not fully protect the intended assemblies and areas of the gas cylinder because it is directly secured to only the cap ring flange of the cylinder. The force of an impact to the upper area of the protector, amplified by the leverage produced by the ratio of the height of the protector to the height of the contact area of the cap ring flange connection, could easily result in breaking the cap ring flange connection leading to damage of the assembly contained within the protector.

U.S. Pat. No. 4,600,033 to Baron describes a guard for gas cylinder valve for attachment to the end of a cylinder of compressed gas comprises a cylindrical portion of diameter approximating the diameter of the intended cylinder and a pair of flanges extending outwardly from the cylindrical portion and contiguous therewith and defining between the flanges a space through which access can be obtained to the interior of the guard for observing and operating upon the valve arrangement of the cylinder. The cylindrical portion is clamped around the cylinder by drawing together the flanges by a pair of bolts extending across the flanges with spaces for defining the minimum space between the flanges. Openings in the cylindrical portion provide handles and access to the interior. The end of the cylindrical portion is open. A chain for supporting the guard and cylinder is attached to the guard and hooks are mounted on the flanges for receiving the hose from the cylinder. The invention described has large openings in the top and side that will not prevent flying metal fragments that may occur if the valve assembly is damaged.

The prior art also discloses a pressure vessel valve housing as shown in U.S. Pat. No. 4,352,370 to Childress, a safety cap assembly for protecting the valved discharge opening of a cylinder containing pressurized fluid as described in U.S. Pat. No. 4,944,424 to Wood, Jr., and the ornamental design for a gas regulator cover as illustrated in U.S. Pat. No. D.295,839 to O'Brien et al. While these devices fulfill their respective, particular objectives and requirements, the aforementioned patents do not disclose a gas cylinder safety cover for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage.

In this respect, the gas cylinder safety cover according to the present invention substantially departs from the conventional concepts and designs of the prior art, and in so doing provides an apparatus primarily developed for the purpose of protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage.

Therefore, it can be appreciated that there exists a continuing need for new and improved gas cylinder safety covers which can be used for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage. In this regard, the present invention substantially fulfills this need.

As illustrated by the background art, efforts are continuously being made in an attempt to develop devices for protecting valved discharge openings of pressurized fluid cylinders during handling and transporting of the cylinders. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of valve protectors now present in the prior art, the present invention provides an improved valve protector construction wherein the same can be utilized for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage. As such, the general purpose of the present invention, which will be described subsequently in greater detail, is to provide a new and improved gas cylinder safety cover apparatus and method which has all the advantages of the prior art valve protectors and none of the disadvantages.

The invention is defined by the appended claims with the specific embodiment shown in the attached drawings. For the purpose of summarizing the invention, the invention may be incorporated into a new and improved gas cylinder safety cover for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage. The gas cylinder safety cover comprises a rigid shield releasably threadedly attachable to a cap ring flange of a standard compressed gas cylinder. The shield is additionally releasedly attachable to the body of the gas cylinder. The shield has perforated metal sides wherethrough the gas cylinder gauges may be viewed and a fixed metal top with a handle. The shield further has a metal bottom plate hingedly connected along one edge to a side thereof whereby the valve, gauge, and regulator assembly is exposed when the shield is hinged back open, or enclosed when the shield is hinged forward closed. The bottom plate additionally has an aperture therethrough wherethrough gas hoses or the like may pass and further has a hole therethrough sized and threaded to be engagable with the cylinder cap ring flange.

The new gas cylinder safety cover also includes means to secure the shield in the closed position comprises a plurality of holes through the bottom plate, a plurality of threaded studs projecting downwardly from the side of the shield opposite the hinge, the studs being engagable with the holes, and a plurality of nuts threadedly engagable with the studs.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an gas cylinder safety cover for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage.

It is therefore an additional object of the present invention to provide a new and improved gas cylinder safety cover which has all the advantages of the prior art valve protectors and none of the disadvantages.

It is another object of the present invention to provide a new and improved gas cylinder safety cover which may be easily and efficiently manufactured and marketed.

It is a further object of the present invention to provide a new and improved gas cylinder safety cover which is of a durable and reliable construction.

An even further object of the present invention is to provide a new and improved gas cylinder safety cover which is susceptible of a low cost of manufacture with regard to both materials and labor, and which accordingly is then susceptible of low prices of sale to the consuming public, thereby making such gas cylinder safety covers economically available to the buying public.

Still yet another object of the present invention is to provide a new and improved gas cylinder safety cover which provides in the apparatuses and methods of the prior art some of the advantages thereof, while simultaneously overcoming some of the disadvantages normally associated therewith.

Still yet another object of the present invention is to provide a new and improved gas cylinder safety cover that does not interfere with the normal operation of the cylinder valve, gauge, and regulator assembly.

Yet another object of the present invention is to provide a new and improved gas cylinder safety cover that is of flexible design so as to be usable with a wide variety of standard compressed gas cylinders and valve, gauge, and regulator assembly configurations.

Even still another object of the present invention is to provide a new and improved gas cylinder safety cover that is operable under the extremes of ambient temperature and environmental conditions encountered during normal use of such compressed gas cylinders.

Still further another object of the present invention is to provide a new and improved gas cylinder safety cover that has positive ventilation so as not to accumulate a build up of gas inside in the event of leakage around the valve, gauge, and regulator assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the new gas cylinder safety cover showing its manner of installation.

FIG. 2 is a rear elevational view of the invention of FIG. 1 illustrating location of the hinge and the method of securing the circular band clamp on the body of the gas cylinder.

FIG. 5 is a perspective view of an alternate embodiment of the invention wherein the shield is cylindrically shaped.

FIG. 6 is a sectional view of the invention of FIG. 5 taken along the line 6—6.

DESCRIPTION OF THE PREFERRED EMBODIMENT

Figure 3:
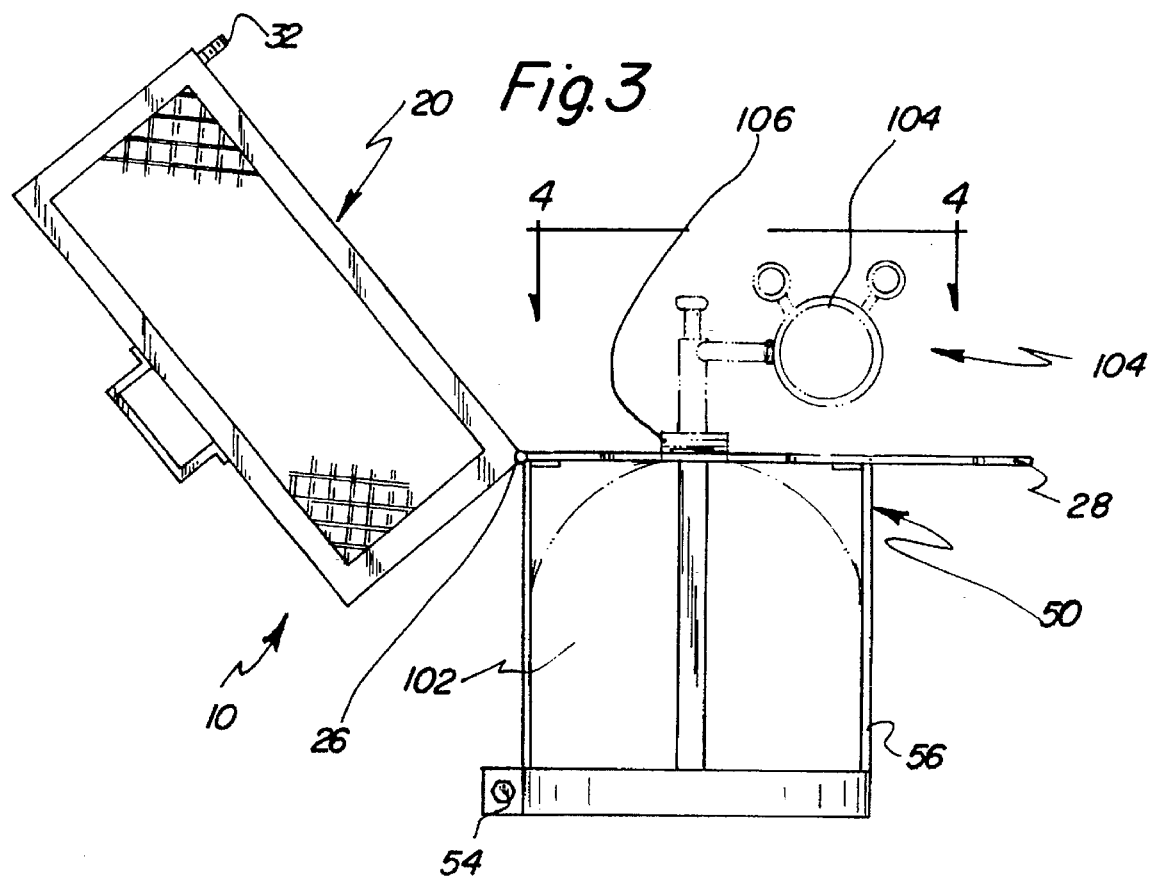
FIG. 3 is a side elevational view of the present invention showing the shield in the hinged back open position exposing the valve, gauge, and regulator assembly.
Figure 4:
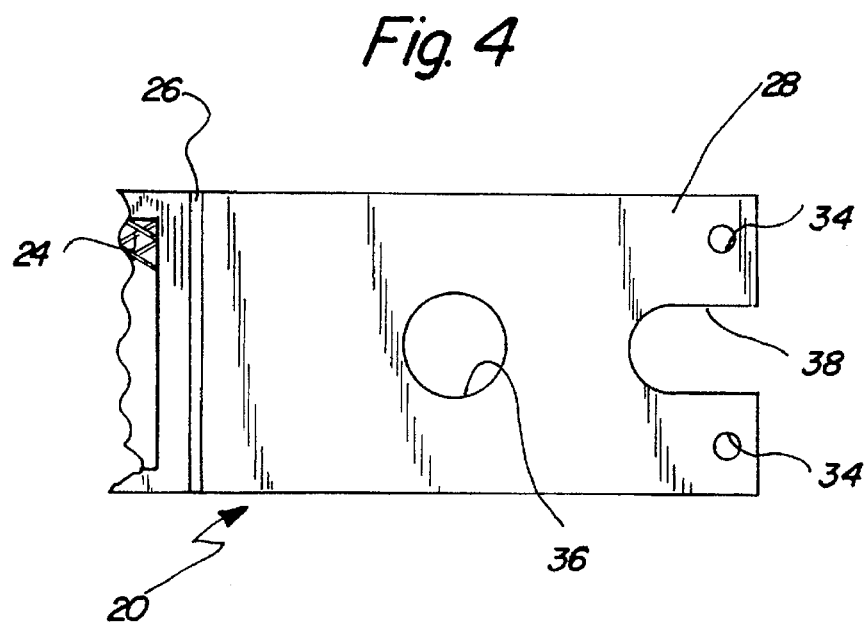
FIG. 4 is a sectional view of the invention of FIG. 3 taken along the line 4—4.

With reference now to the drawings, and in particular to FIG. 1 thereof, a new and improved gas cylinder safety cover embodying the principles and concepts of the present invention and generally designated by the reference numeral 10 will be described.

From an overview standpoint, the gas cylinder safety cover is adapted for use for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage. See FIG. 1.

With reference now to FIGS. 1–4 and more specifically, it will be noted that a new and improved gas cylinder safety cover 10 for protecting the valve, gauge, and regulator assembly 104 of pressurized cylinders, such as in oxyacetylene torch sets, from damage due to a fall or dropped object and additionally protecting nearby people from flying metal fragments that may be propelled by the explosive force resulting from such damage. The gas cylinder safety cover 10 comprises a rigid shield 20 releasably threadedly attachable to a cap ring flange 106 of a standard compressed gas cylinder 102.

The shield 20 is additionally releasedly attachable to the body of the gas cylinder 102. The shield 20 has perforated metal sides 24 wherethrough the gas cylinder gauges may be viewed and a fixed metal top 22 with a handle 30. The shield 20 further has a metal bottom plate 28 hingedly connected to the lower edge of the rear wall of the cover 26 whereby the valve, gauge, and regulator assembly 104 is exposed when the shield 20 is hinged back open, or enclosed when the shield is hinged forward closed. The bottom plate 28 additionally has an aperture 38 therethrough wherethrough gas hoses or the like may pass and further has a hole 36 therethrough sized and threaded to be engagable with the cylinder cap ring flange 106.

The new gas cylinder safety cover 20 also includes means to secure the shield in the closed position. The securement means comprises a plurality of holes 34 through the bottom plate 28, a plurality of threaded studs 32 projecting downwardly from the side of the shield opposite the hinge, the studs 32 being engagable with the holes 34, and a plurality of nuts 40 threadedly engagable with the studs 32.

Further included in the new design is means to releasably secure the shield 20 to the gas cylinder body 102. The securement means 50 comprises a circular band clamp 52 sized to surround the body of the cylinder 102. The band clamp 52 includes a transverse split 62 therethrough, the edges of the split being defined by facing ends of the band clamp wherebetween a circumferential adjustment zone is defined.

The facing ends of the band clamp also have outwardly projecting mating flanges 54 and 64 that are releasably secured to each other by a nut 60 and bolt 58 whereby the clamp 52 may be tightened around the cylinder body 102. The securement means 50 further has a plurality of equally spaced apart upwardly projecting rigid straps 56 fixedly connected at one end to the band clamp 52. The other end of the straps 56 are fixedly connected to the bottom of the bottom plate 28.

An alternate embodiment of the new gas cylinder safety cover, and generally designated by the reference numeral 130, is shown in FIGS. 5 and 6 wherein the shield has cylindrical sides 132 with a perforated arcuate door 150 hingedly connected thereto. The curvature of the door 150 closely conforms to the curvature of the shield sides 132 whereby creating a tight closure without gaps. The door 150 additionally has latch means 156 to secure the door 150 in the closed position.

Figure 7:
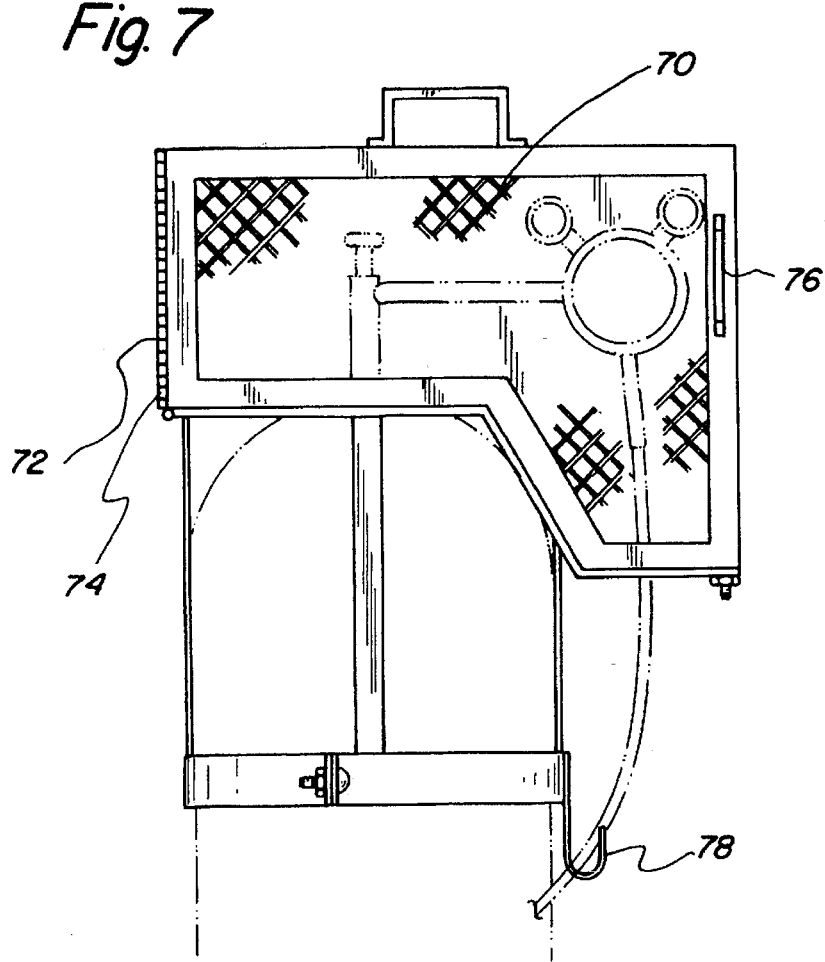
FIG. 7 is a side elevational view of a further alternate embodiment of the present invention showing a side of the shield in a closed position exposing the valve, gauge, and regulator assembly.
Figure 8:
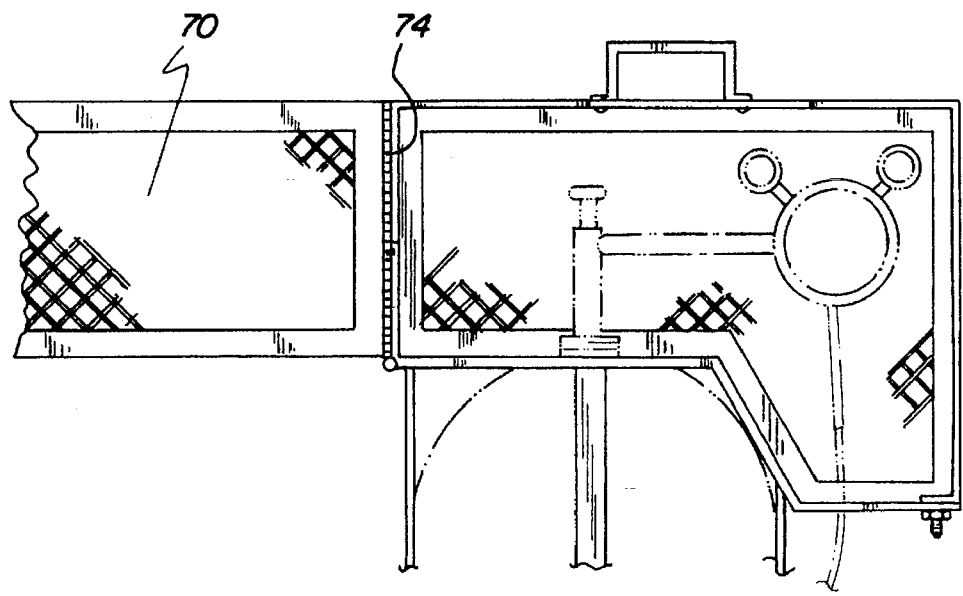
FIG. 8 is a side elevational view of a further alternate embodiment of the present invention showing a side of the shield in a closed position exposing the valve, gauge, and regulator assembly.

In a still further alternate embodiment, the cover comprises a pair of similarly shaped sides 70 pivotally coupled to the rear wall of the cover by hinges 74 at one end thereof. See FIG. 7. Each sidewall may be pivoted with respect to the rear wall for allowing access to interior of the cover. See FIG. 8. Further, each side wall and bottom plate are shaped for corresponding to the top surface of a gas cylinder to fully protect equipment within the cover. Handles 76 are coupled to each sidewall opposite the pivotally coupled end for allowing easy manipulation of the sidewall position. Finally, the alternate embodiment of the cover includes a hook 78 coupled to the band clamp for securing and supporting hoses extending from equipment being protected by the cover.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A gas cylinder safety cover for protecting a valve, gauge, and regulator assembly of pressurized cylinders from damage, the gas cylinder safety cover comprising:

a rigid shield releasably attachable to a standard compressed gas cylinder, the shield having perforated metal sides wherethrough the gas cylinder gauges can be viewed, the shield also having a fixed metal top, the shield further having a metal bottom plate hingedly connected thereto whereby the valve, gauge, and regulator assembly is exposed when the shield is hinged back open or enclosed when the shield is hinged forward closed, the shield being threadably engagable to a cap ring flange of a standard compressed gas cylinder with the bottom plate including a hole extending therethrough sized and threaded to be engagable with the cylinder cad ring flange;

attachment means to releasably attach the shield to the body of the gas cylinder, the attachment means comprising a plurality of holes through the bottom plate, a plurality of threaded studs projecting downwardly from the side of the shield opposite the hinge, the studs being engagable with the holes, and a plurality of nuts threadably engagable with the studs;

means to secure the shield in the closed position; and means to releasably secure the shield to the gas cylinder body.

2. The gas cylinder safety cover of claim 1, and further including handle means fixedly connected to the top thereof.

3. The gas cylinder safety cover of claim 2 wherein the bottom plate is hingedly connected along one edge to a side of the shield.

4. The gas cylinder safety cover of claim 3 wherein the bottom plate additionally has an aperture therethrough wherethrough gas hoses or the like may pass.

5. The gas cylinder safety cover of claim 4 wherein the means to secure the shield to the gas cylinder body comprises a circular band clamp sized to surround the body of the cylinder, the securement means further having a plurality of equally spaced apart upwardly projecting rigid straps fixedly connected at one end to the band clamp, the other end of the straps being fixedly connected to the bottom of the bottom plate.

6. The gas cylinder safety cover of claim 5 wherein the circular band clamp includes a transverse split therethrough, the edges of the split being defined by facing ends of the band clamp wherebetween a circumferential adjustment zone is defined, the facing ends of the band clamp also having outwardly projecting mating flanges that are releasably secured to each other by a nut and bolt whereby the clamp may be tightened around the cylinder body.

7. A new and improved gas cylinder safety cover for protecting the valve, gauge, and regulator assembly of pressurized cylinders, such as in oxyacetylene torch sets, from damage due to a fall or dropped object and additionally protecting nearby people from flying metal fragments that may be propelled by the explosive force resulting from such damage, the gas cylinder safety cover comprising:

a rigid shield releasably threadedly attachable to a cap ring flange of a standard compressed gas cylinder, the shield additionally being releasedly attachable to the body of the gas cylinder, the shield having perforated metal sides wherethrough the gas cylinder gauges may be viewed, the shield also having a fixed metal top with a handle, the shield further having a metal bottom plate hingedly connected along one edge to a side thereof whereby the valve, gauge, and regulator assembly is exposed when the shield is hinged back open or enclosed when the shield is hinged forward closed, the bottom plate additionally having an aperture therethrough wherethrough gas hoses or the like may pass, the bottom plate further having a hole therethrough sized and threaded to be engagable with the cylinder cap ring flange;

means to secure the shield in the closed position comprising a plurality of holes through the bottom plate, a plurality of threaded studs projecting downwardly from the side of the shield opposite the hinge, the studs being engagable with the holes, and a plurality of nuts threadedly engagable with the studs; and means to releasably secure the shield to the gas cylinder body comprising a circular band clamp sized to surround the body of the cylinder, the band clamp includes a transverse split therethrough, the edges of the split being defined by facing ends of the band clamp wherebetween a circumferential adjustment zone is defined, the facing ends of the band clamp also having outwardly projecting mating flanges that are releasably secured to each other by a nut and bolt whereby the clamp may be tightened around the cylinder body, the securement means further having a plurality of equally spaced apart upwardly projecting rigid straps fixedly connected at one end to the band clamp, the other end of the straps being fixedly connected to the bottom of the bottom plate.

8. The gas cylinder safety cover of claim 7 wherein the shield has cylindrical sides with a perforated arcuate door hingedly connected thereto, the door curvature closely conforming to the curvature of the shield sides whereby creating a tight closure without gaps; and latch means to secure the door in the closed position.

9. The gas cylinder safety cover of claim 7 wherein the cover comprises a pair of similarly shaped sides pivotally coupled to a rear wall of the cover.

10. The gas cylinder safety cover of claim 9 wherein each side wall and the bottom plate are shaped for corresponding to the top surface of a gas cylinder to fully protect equipment within the cover.

11. The gas cylinder safety cover of claim 10 and further including a hook coupled to the band clamp for securing and supporting hoses extending from equipment being protected by the cover.

* * * * *